United States Patent [19]

Sugimura et al.

[11] 4,166,478
[45] Sep. 4, 1979

[54] ACCUMULATOR HAVING A BLADDER TO BE FILLED WITH LIQUID

[76] Inventors: Nobuyuki Sugimura; Kazuo Sugimura, both of 308, Mabase, Shimizu-shi, Shizuoka-ken, Japan

[21] Appl. No.: 862,863

[22] Filed: Dec. 21, 1977

[51] Int. Cl.$^2$ ............................................. F16L 55/04
[52] U.S. Cl. ............................................. 138/30
[58] Field of Search ........................... 138/26, 30, 31; 417/540; 425/DIG. 1; 60/413, 415

[56] References Cited

U.S. PATENT DOCUMENTS

| | | | |
|---|---|---|---|
| 1,950,107 | 3/1934 | Guinn et al. | 138/30 |
| 2,342,356 | 2/1944 | Mercier | 138/30 |
| 2,563,257 | 8/1951 | Loukonen | 138/30 |
| 3,195,577 | 7/1965 | Greer | 138/30 |
| 3,483,893 | 12/1969 | Morley | 138/30 |
| 3,580,290 | 5/1971 | Sugimura et al. | 138/30 |
| 3,674,053 | 7/1972 | Murman et al. | 138/30 |

FOREIGN PATENT DOCUMENTS 885436  5/1943  France ............................ 417/540

Primary Examiner—Richard R. Stearns
Attorney, Agent, or Firm—Ira Milton Jones

[57] ABSTRACT

The hydropneumatic accumulator disclosed herein comprises a rigid upright vessel, the mouth of which is at the bottom, containing an inverted bag-like bladder. The mouths of the vessel and of the bladder are sealed to one another. The bladder extends upwardly within the vessel interior and divides the same into inner and outer compartments which respectively contain an incompressible liquid medium and a compressible gaseous medium. To protect the bladder from damage by uncontrolled flexure of its wall in response to variations in the relative pressures within the inner and outer compartments, an inverted conical shape-defining member projects down into the upper closed end of the bladder and a perforated rigid shell projects upwardly into the bottom of the bladder. In addition, vertically extending circumferentially spaced stiffening ribs are formed in the wall of the bladder to hold the bladder upright.

10 Claims, 7 Drawing Figures

U.S. Patent Sep. 4, 1979 Sheet 1 of 3 4,166,478

ACCUMULATOR HAVING A BLADDER TO BE FILLED WITH LIQUID

This invention relates to a hydropreumatic accumulator consisting of a rigid vessel and an elastically resilient bladder which divides the vessel into inner and outer compartments.

An example of the type of accumulator to which this invention pertains will be found in the Morley U.S. Pat. No. 3,483,893. As in the Morely patent, the accumulator of this invention has its inner compartment—which, of course, is the interior of the bladder—connectable with a source of pressurized substantially incompressible hydraulic medium, and its outer compartment, i.e. the space within the rigid-walled vessel around the bladder, connectable with a source of gaseous, and hence compressible, fluid medium. Accordingly, when the accumulator is in service, the wall of its bladder is subjected to considerable flexure as the pressure differential in its inner and outer compartments fluctuates. This problem has plagued the industry for many years and, while various solutions have been proposed, no completely satisfactory answer is known to exist in the prior art.

With a view to satisfying the need for a more reliable accumulator of the type that employs an elongated bag-like elastically resilient bladder, this invention has as its purpose and object the provision of shape-defining structure at the opposite ends of the bladder by which the walls of the bladder are supported and held properly oriented during deflation of the bladder as the pressure outside the bladder increasingly exceeds the pressure within the bladder.

Also, towards the attainment of its primary objective of providing a more reliable accumulator, this invention provides assurance against any portion of the bladder being forced into and closing the mouth through which the liquid enters, no matter how great the pressure on the exterior of the bladder may be.

An especially significant feature of this invention resides in the provision of longitudinally extending reinforcing ribs formed integrally with the wall of the bladder, and so oriented as to control inward flexure of the baffle, wall and, in so doing, support the baffle in its intended upright position.

A still further feature of the invention is the provision in one embodiment thereof, of a baffle arrangement in the inlet for the hydraulic medium by which smooth flow into and from the bladder is assured, despite pressure pulsations in the hydraulic medium.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of the embodiments of the invention constructed according to the best mode so far devised for the practical application of the principles thereof, and in which.

Figure 1:
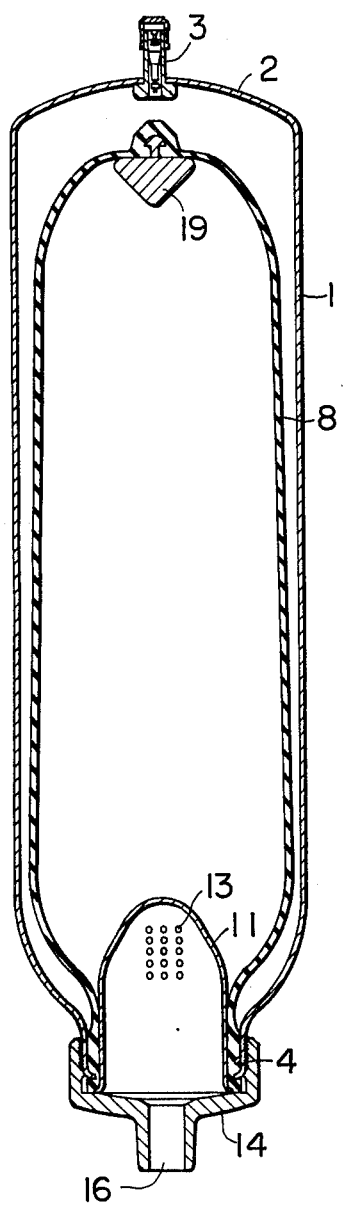
FIG. 1 is a longitudinal section view through an accumulator constructed in accordance with one embodiment of the present invention.
Figure 2:
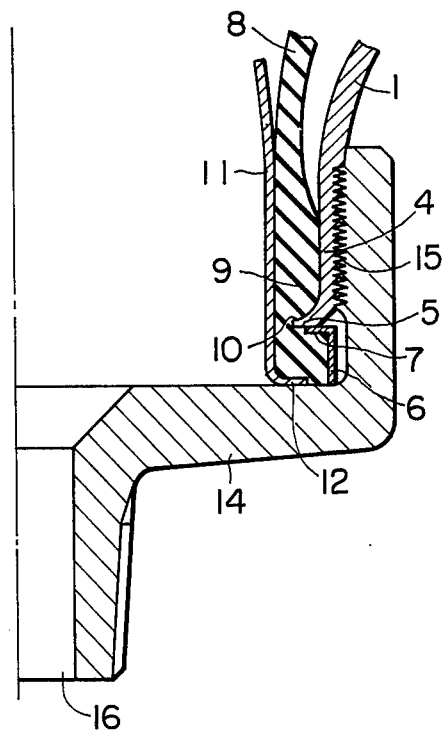
FIG. 2 is a detail sectional view on an enlarged scale of the lower right-hand portion of FIG. 1.

Referring now to the accompanying drawings, and especially to FIG. 1 and FIG. 2, the numeral 1 designates an upright cylindrical rigid-walled vessel made of metal capable of withstanding considerable internal pressure. The top end of it is closed by a semispherical wall 2 provided at its center with a valved air inlet 3. For the major portion of its length the vessel is a uniform diameter cylinder, but at the lower portion thereof it is gradually reduced in diameter to terminate in a cylindrical neck 4, the extreme bottom of which forms an inturned flange 5. This flange 5 is seated on the horizontal flange 7 of an annular supporting ring 6 that is L-shaped in cross section.

Within the vessel is an inverted bag-like bladder 8 made of natural or synthetic rubber. The mouth of this bladder, which—like the mouth of the vessel—is at the bottom, is defined by a thickened wall portion 9. In the outer peripheral side of this thickened wall portion is a groove 10 for the reception of the inturned flange 5 at the vessel mouth and the flange portion of the annular supporting ring.

An inverted cup or shell 11 made of thin steel plate is bent outward at its bottom edge to form a flange 12.

This flange is clamped between the downwardly facing surface of the mouth of the bladder and the upwardly facing surface of a cap 14 that is threaded, as at 15, to the neck 4 of the vessel. A liquid port 16 in the center of the cap opens into the cup or shell 11 and perforations 13 in the uppermost part of the cup or shell lead into the bladder at an elevation well above its neck 4.

It will be evident from the foregoing description that the mouths of the vessel and of the bladder are sealed to one another, and that the presence of the inverted cup or shell 11 in the mouth of the bladder supports the bladder against being forced into the mouth of the vessel.

Figure 3:
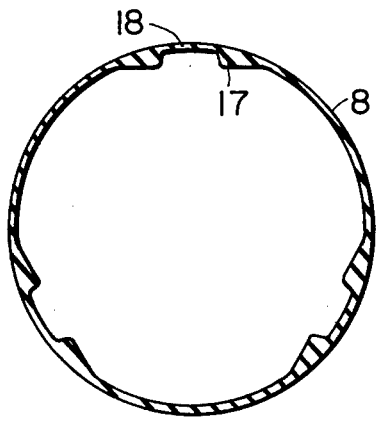
FIG. 3 is a horizontal cross sectional view through the bladder in its normal state.
Figure 4:
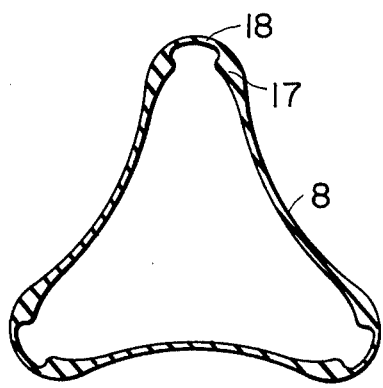
FIG. 4 and FIG. 5 are also horizontal cross sectional views through the bladder illustrating the same in two different stages of deflation resulting from forced discharge of liquid therefrom.
Figure 5:
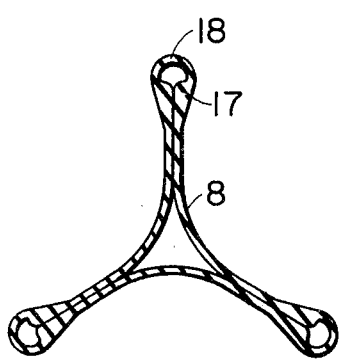

As illustrated in FIG. 3, the wall of the bladder 8 has a plurality of circumferentially equispaced pairs (three in the present case) of longitudinally extending stiffening ribs 17, each pair flanking a thin wall 18. By virtue of the presence of these stiffening ribs, upon inward displacement of the bladder 8 its cross-sectional shape changes from cylindrical to triangular as shown in FIG. 4 and then, in response to greater external pressure, to a three angled asteroid shape as shown in FIG. 5. As will be readily evident, by so controlling the response of the bladder wall to external pressure, the bladder is supported against objectionable deformation.

Cooperating with the stiffening ribs in supporting the bladder is a solid inverted conical shape-defining member 19. In the embodiment of this invention illustrated in FIG. 1, this member 19 is secured to and projects down from the top of the bladder at the center thereof.

Figure 6:
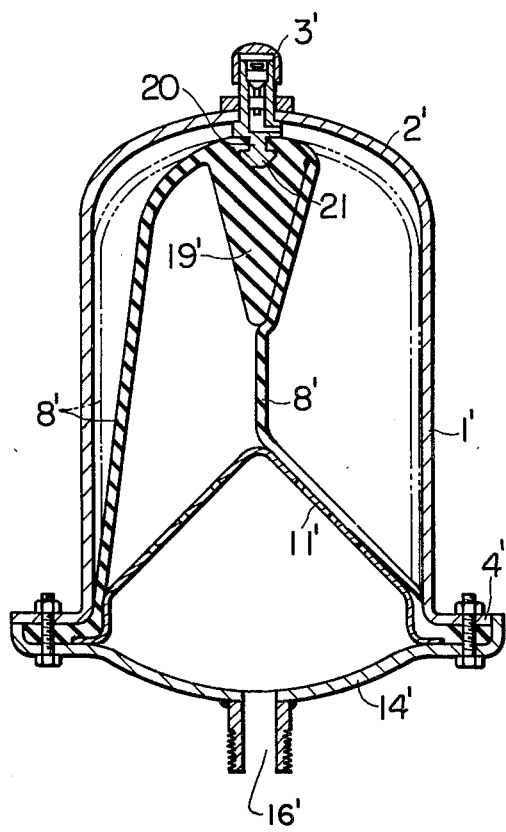
FIG. 6 is a longitudinal section view of an accumulator constructed in accordance with another embodiment of the present invention.

In the embodiment of the invention shown in FIG. 6, the lower end of the air supply valve 3' forms a hanger 20 having an enlarged head 21 which is received in a socket in the shape-defining member 19', which in this case is integral with the top wall of the bladder 8'. Thus the top end of the bladder is suspended from the top wall 2' of the vessel.

Figure 7:
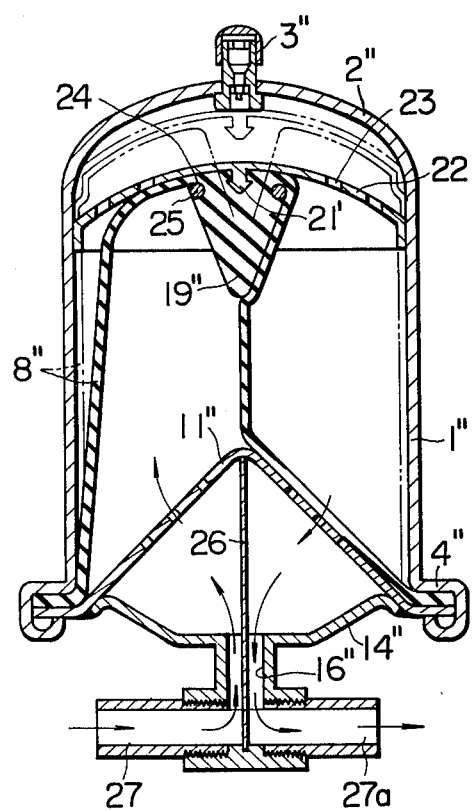
FIG. 7 is a longitudinal section view of still another embodiment of the present invention.

Although in FIGS. 6 and 7 the specific manner in which the mouths of the vessel and the bladder are sealed to one another differs from that of FIG. 1 (see 4' and 14' in FIG. 6, and 4" and 14" in FIG. 7), and the shape of the inverted perforated cup or shell—which, in FIG. 6, is identified by the numeral 11'—differs from that of FIG. 1, it will be obvious that functionally those two embodiments of the invention are alike. The embodiment of the invention shown in FIG. 7 differs from those of FIGS. 1 and 6 by the provision of an inverted cup-shaped guide member 22 that is slidably mounted in the vessel 1. From the center of the top wall of this guide member 22, a hanger 21 extends down to be received in a socket in the inverted conical shape-defining member, which—as in FIG. 6—is integral with the top of the bladder. The guide member 22 has air passages 23 which permit the guide member to move up and down without hindrance by the air pressure in the vessel. An annular groove 24 around the base of the inverted conical shape-defining 19' receives a ring 25, which—because of its round cross-section—aids in supporting in the region of its connection with the member 19" during flexure of the bladder in response to varying pressure thereon.

As will appear from comparison of FIGS. 6 and 7, the inverted perforated cups and shells 11', 11" that extend upwardly into the bladder are similar in shape and structure in both these embodiments of the invention. But note that, in FIG. 7, there is a baffle plate 26 that extends down from the top of the cup or shell 11" through the liquid port 16" into the pipe line to which the accumulator is connected. As a result, the entry into the bladder and the exit therefrom are defined from one another, as identified by the numerals 27 and 27a.

In operation, the wall of the bladder in all embodiments disclosed assumes a shape that is not only determined by the difference in pressure between the gaseous medium outside the bladder and the pressure of the liquid medium inside the bladder, but also by the longitudinally extending circumferentially spaced paired stiffening ribs 17 in the wall of the bladder and the thin wall portions 18 therebetween. As the gas pressure on the exterior of the bladder increases, its wall assumes the triangular shape shown in FIG. 4, and—with still greater dominance of gas pressure—the wall of the bladder folds into the asteroid shape shown in FIG. 5. The stiffening ribs thus serve to hold the bladder in its intended upright posture.

At the same time, the inverted solid conical shape-defining member 19, 19', 19" at the top of the bladder protects the adjacent wall portions of the bladder from being collapsed and thus aids in achieving smooth and controlled flexure of the bladder. In the case of the embodiment of the invention shown in FIG. 7, this desirable result is further assured by the presence of the ring 25 at the base of the inverted conical shape-defining member.

At the bottom of the bladder, the inverted cup or shell 11, 11', 11", by extending up into the bladder a substantial distance, provides support for the bladder wall as the pressure on the exterior thereof increases, and by its presence assures against the bladder ever being forced down into the mouth through which liquid enters the interior of the bladder. Accordingly, the bladder can be deformed to its smallest volume without undue stress in any part thereof.

When pressurized liquid enters the bladder while gas pressure exists in the vessel, it gradually expands from the folded shape of FIG. 5 to the shape shown in FIG. 4 and finally attains its largest capacity as shown in FIG. 3. Since the bladder 8 is thus and gradually unfolded or expanded, its intrinsic structure itself is not subjected to undue stress, inasmuch as the rubber keeps its original state without any extension.

Therefore even with repeated expansion and contraction of the bladder, it maintains its elascity without any fatigue.

Also as seen in FIG. 6, since the bladder is suspended in the center of the vessel, it can deform in regular shape while either expanding or contracting whereby any distortion or undue stress caused by eccentric positioning of said bladder with not occur.

Further as seen in FIG. 7, by supporting the bladder from a guide member that slides up and down along the inside wall of the vessel, the bladder is always centered in the vessel as it expands or contracts in an axial direction, thus protecting the bladder from being eccentrically deformed or distorted.

Finally, when the entry into the bladder is provided with a baffle wall, as shown in FIG. 7, the bladder is protected from the effects of sudden pressure fluctuations in the pipe line with which the accumulator is connected. This desirable result stems from the fact that the baffle wall divides the entry into the bladder into two well defined flow paths that maintain their separation until well within the interior of the bladder.

Those skilled in the art will appreciate that the invention can be embodied in forms other than as herein disclosed for purpose of illustration.

The invention is defined by the following claims.

We claim:

1. In a hydropneumatic accumulator of the type wherein an elongated elastically resilient inverted bag-like bladder having a mouth at its bottom on the longitudinal axis of the bladder is located in an elongated rigid-walled upright vessel also having a mouth at its bottom coaxially of the bladder mouth, to divide the interior of the vessel into inner and outer compartments, wherein the mouths of the bladder and of the vessel are sealed to one another and thus provide an inlet into the bladder for a relatively incompressible hydraulic medium, and wherein an inlet in a wall of the vessel provides for the introduction of a pressurized compressible gaseous medium into the outer compartment, the improvement which comprises:

means for minimizing the likelihood of failure of the bladder wall as the result of fluctuations in the relative pressures within the inner and outer compartments, said means comprising an inverted solid substantially conical shape-defining member located coaxially within the upper closed end of the bladder and projecting downwardly therefrom to support the adjacent side wall portions of the bladder upon flexure thereof inwardly toward the bladder axis.

2. The hydropneumatic accumulator of claim 1 further characterized by means suspending said inverted solid substantially conical member from the upper closed end of the bladder.

3. The hydropneumatic accumulator of claim 1, further characterized by means supportingly connecting said inverted solid substantially conical member with the rigid-walled vessel.

4. The hydropneumatic accumulator of claim 3, wherein it is the top wall of the vessel to which said inverted conical member is supportingly connected.

5. The hydropneumatic accumulator of claim 4, wherein the bladder and the vessel have a common vertical axis and said connection between the inverted conical member and the top wall of the vessel is on said common axis.

6. The hydropneumatic accumulator of claim 1, further characterized by a movable guide member in the vessel above the bladder,
    means constraining said guide member to vertical motion with respect to the vessel; and means connecting said inverted conical member with said guide member.

7. The hydropneumatic accumulator of claim 6, wherein said rigid-walled vessel is essentially a vertically oriented cylinder with a central vertical axis;
    wherein said guide member slidingly engages the cylindrical side wall of the vessel; and wherein the connection of said inverted conical member with the guide member is coaxial with said central vertical axis.

8. The hydropneumatic accumulator of claim 1, wherein the bladder has a substantially vertically extending side wall; and further characterized by means for preventing collapse of the bladder comprising at least three pairs of substantially vertically oriented spaced apart stiffening ribs that are integral with said side wall and project into the interior of the bladder at opposite sides of thin-walled portions of the bladder side wall, whereby upon inward deflection of the bladder side wall said stiffening ribs maintain the bladder vertically oriented.

9. The hydropneumatic accumulator of claim 1, further characterized by:
    a rigid inverted cup in the mouth of the bladder to hold the same against displacement from the mouth of the vessel and thereby coact with said inverted conical member in preventing collapse of the bladder,
    said inverted cup having a perforated portion extending into the bladder to provide an entry into the bladder.

10. The hydropneumatic accumulator of claim 9, further characterized by:
    A. a cap having
        (1) a peripheral edge portion joined to the mouth of the vessel and
        (2) a hollow hub portion in open communication with said inverted rigid inverted cup,
    B. means for connecting said hollow hub portion with upstream and downstream sections of a pipe line through which the relatively incompressible hydraulic medium flows; and
    C. a partition in said hollow hub portion dividing the same into an inlet port that is connectable with the upstream section of said pipe line and an outlet port that is connectable with the downstream section of said pipe line, said partition extending upwardly beyond the cap and into engagement with the top of said inverted rigid cup to thereby facilitate flow of pressurized hydraulic medium into and from the bladder.

* * * * *

UNITED STATES PATENT OFFICE
CERTIFICATE OF CORRECTION

Patent No. 4,166,478      Dated September 4, 1979

Inventor(s)     NOBUYUKI SUGIMURA ET AL

It is certified that error appears in the above-identified patent and that said Letters Patent are hereby corrected as shown below:

Column 1:     Line 1, "hydropneumatic" is misspelled

Column 2:     Line 16, "of it" should read --of said vessel--

Column 3:     Line 24, "member" is omitted after "shape-defining"

Line 26, "the bladder 8" is omitted before "in"

Signed and Sealed this

Twentieth Day of November 1979

[SEAL]

Attest:

RUTH C. MASON
Attesting Officer

LUTRELLE F. PARKER
Acting Commissioner of Patents and Trademarks